(12) United States Patent
Rolle et al.

(10) Patent No.: US 8,082,729 B2
(45) Date of Patent: Dec. 27, 2011

(54) CONFIGURATION HAVING A PROTECTED TURBOCHARGER IN AN EXHAUST GAS RECIRCULATION LINE AND MOTOR VEHICLE HAVING THE CONFIGURATION

(75) Inventors: Arndt-Udo Rolle, Ludwigsburg (DE); Rolf Brück, Bergisch Gladbach (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 259 days.

(21) Appl. No.: 12/236,909

(22) Filed: Sep. 24, 2008

(65) Prior Publication Data

US 2009/0071151 A1 Mar. 19, 2009

Related U.S. Application Data

(63) Continuation of application No. PCT/EP2007/002437, filed on Mar. 20, 2007.

(30) Foreign Application Priority Data

Mar. 24, 2006 (DE) .......................... 10 2006 013 709

(51) Int. Cl.
  *F02M 25/06* (2006.01)
  *F01N 5/04* (2006.01)
  *F01N 3/02* (2006.01)
  *F02B 33/44* (2006.01)
(52) U.S. Cl. .............. 60/278; 60/280; 60/311; 60/605.2
(58) Field of Classification Search .................... 60/278, 60/280, 299, 311, 605.1, 605.2
See application file for complete search history.

(56) References Cited

U.S. PATENT DOCUMENTS

| | | | |
|---|---|---|---|
| 3,998,599 A * | 12/1976 | Fedor | 422/180 |
| 4,345,572 A | 8/1982 | Suzuki et al. | |
| 4,835,964 A | 6/1989 | Kume et al. | |
| 5,298,046 A * | 3/1994 | Peisert | 55/486 |
| 6,301,887 B1 | 10/2001 | Gorel et al. | |
| 6,474,060 B2 | 11/2002 | Khair | |
| 6,534,021 B1 | 3/2003 | Maus | |
| 6,981,375 B2 * | 1/2006 | Sisken et al. | 60/612 |

(Continued)

FOREIGN PATENT DOCUMENTS

DE  26 10 042 A1  9/1976

(Continued)

OTHER PUBLICATIONS

Sigma-Aldrich Co., "Particle Size Conversion", retrieved Aug. 9, 2010.*

(Continued)

*Primary Examiner* — Kenneth Bomberg
*Assistant Examiner* — Audrey K. Bradley
(74) *Attorney, Agent, or Firm* — Laurence A. Greenberg; Werner H. Stemer; Ralph E. Locher

(57) ABSTRACT

A configuration for treating exhaust gases of an internal combustion engine having a predetermined displacement volume, includes an exhaust gas recirculation line. Exhaust gas flowing through the exhaust gas recirculation line interacts with a turbocharger. A screening layer is provided in the exhaust gas recirculation line upstream of the turbocharger. The screening layer is larger than an average cross section of the exhaust gas recirculation line. A motor vehicle having at least one such configuration is also provided.

16 Claims, 2 Drawing Sheets

U.S. PATENT DOCUMENTS

| | | | |
|---|---|---|---|
| 7,043,914 B2 * | 5/2006 | Ishikawa | 60/605.2 |
| 7,189,374 B1 | 3/2007 | Hawker | |
| 2001/0042372 A1 * | 11/2001 | Khair | 60/278 |
| 2002/0062562 A1 * | 5/2002 | Li et al. | 29/890 |
| 2002/0148209 A1 * | 10/2002 | Giles et al. | 55/482 |
| 2005/0081835 A1 * | 4/2005 | Larson et al. | 123/568.11 |
| 2005/0109017 A1 | 5/2005 | Wirkus et al. | |
| 2006/0021335 A1 | 2/2006 | Opris | |

FOREIGN PATENT DOCUMENTS

| | | |
|---|---|---|
| DE | 25 19 609 A1 | 11/1976 |
| DE | 34 12 081 A1 | 11/1984 |
| DE | 39 19 533 A1 | 12/1990 |
| DE | 197 04 147 A1 | 8/1998 |
| DE | 101 13 449 A1 | 9/2001 |
| EP | 0 321 451 A2 | 6/1989 |
| JP | 62-83015 A | 4/1987 |
| JP | 2001-132555 A | 5/2001 |
| WO | 00/77353 A2 | 12/2000 |
| WO | 01/36805 A1 | 5/2001 |
| WO | 2004/042222 A1 | 5/2004 |

OTHER PUBLICATIONS

Merriam-Webster Dictionary, Definition of "Filter", retrieved Mar. 23, 2011.*

International Search Report, dated May 24, 2007.

* cited by examiner

CONFIGURATION HAVING A PROTECTED TURBOCHARGER IN AN EXHAUST GAS RECIRCULATION LINE AND MOTOR VEHICLE HAVING THE CONFIGURATION

CROSS-REFERENCE TO RELATED APPLICATION

This is a continuation, under 35 U.S.C. §120, of copending International Application No. PCT/EP2007/002437, filed Mar. 20, 2007, which designated the United States; this application also claims the priority, under 35 U.S.C. §119, of German Patent Application DE 10 2006 013 709.4, filed Mar. 24, 2006; the prior applications are herewith incorporated by reference in their entirety.

BACKGROUND OF THE INVENTION

Field of the Invention

The present invention relates to a configuration for treating exhaust gases of an internal combustion engine having a predetermined displacement volume. The configuration includes an exhaust gas recirculation line, wherein the exhaust gas flowing therethrough interacts with a turbocharger. The invention can be particularly applied to mobile internal combustion engines as are provided in motor vehicles, for example.

Many such exhaust gas treatment configurations with exhaust gas recirculation are known. The aim of providing such configurations is for exhaust gas which has not yet completely reacted to be recycled in part to the internal combustion engine in order to ensure a more complete reaction of noncombusted hydrocarbons and/or a further conversion of exhaust gas components in that way.

The use of a turbocharger is intended to obtain regularly higher torques and hence higher engine power levels for the internal combustion engine. That is achieved by compressing the induced air or the recycled exhaust gas. The increased density means, in particular, that more oxygen can enter the combustion chamber of the engine during each induction cycle. Improved combustion is possible with the higher oxygen content, such that the power can ultimately be increased. The heat energy and kinetic energy of the engine exhaust gas in that case is regularly used to drive the exhaust gas turbine of the turbocharger. The exhaust gas turbine powers the compressor in the exhaust gas recirculation line or the air induction line.

However, it has now been found that it is precisely the compressor of the turbocharger which frequently exhibits significant damage that can be detected, in particular, on the compressor wheel due to the ingress of foreign bodies. Those foreign bodies are, in particular, parts of upstream-mounted exhaust gas treatment components, their coatings and/or also solids which are added to the exhaust gas as additives or have formed in the exhaust gas line.

SUMMARY OF THE INVENTION

It is accordingly an object of the invention to provide a configuration having a protected turbocharger in an exhaust gas recirculation line and a motor vehicle having the configuration, which overcome the hereinafore-mentioned disadvantages and at least partially solve the technical problems of the heretofore-known devices of this general type. It is particularly intended to specify a configuration for treating exhaust gases that ensures a permanent operation of the turbocharger, with it being possible at the same time to readily achieve the efficiency of the turbocharger or of the desired charging pressure.

With the foregoing and other objects in view there is provided, in accordance with the invention, a configuration for treating exhaust gases of an internal combustion engine having a predetermined displacement volume. The configuration comprises an exhaust gas recirculation line having an average cross section and a turbocharger. Exhaust gas flowing through the exhaust gas recirculation line interacts with the turbocharger. A screening layer is disposed in the exhaust gas recirculation line upstream of the turbocharger. The screening layer is larger than the average cross section of the exhaust gas recirculation line.

It is possible, in principle, for such a configuration to be operated in conjunction with a stationary internal combustion engine, although the use with a mobile internal combustion engine is preferred. The invention particularly relates in this regard to gasoline engines, diesel engines and the like. Common to those internal combustion engines is that they have a displacement volume. A displacement volume is to be understood to mean the sum of the volume which the combustion chambers of the internal combustion engine have as a whole. The displacement volume for such internal combustion engines is particularly situated within the range of from 0.5 l to 13.0 l, with the displacement volume used in the overwhelming majority of automobiles to be encountered nowadays lying within a range of from 0.8 l to 3.0 l.

It is now proposed in this case to provide a screening layer upstream of the turbocharger as viewed with respect to the exhaust gas flow. A screening layer particularly means a planar structure. Such a screening layer differs from known filters, for example by virtue of the fact that, instead of providing a plurality of channels, it is exposed to flow over a large surface area. The screening layer can in this case be formed as a surface which spans the cross section of the exhaust gas recirculation line. However, simple folded or assembled constructions, for example in the form of a cylinder, a bag, a fold or the like, are also possible if appropriate. This shaped structure then regularly has only a single inflow channel through which the exhaust gas is brought into contact with the majority, in particular the whole, of the screening area.

With regard to the size of the screening layer, it is required that the screening layer is larger than an average cross section of the exhaust gas recirculation line, in other words is thus preferably positioned (at least in part) not (only) parallel to the average cross section but, for example, has a structure or is disposed obliquely with respect to the cross section. With reference to the average cross section, it should be noted that this constitutes an average value over the entire length of the exhaust gas recirculation line. The diameters of the exhaust gas recirculation lines of passenger cars are usually situated within a range of 30 millimeters [mm], resulting in an average cross section of about 700 square millimeters [mm$^2$]. Given the increased screening area, the exhaust gas can flow through the screening layer with a considerably lower pressure loss. An effective protective measure is thus brought about which nevertheless has only an insignificant impact on the flow behavior of the exhaust gas toward the turbocharger.

In accordance with another feature of the invention, the screening layer provides a screening area of at least 10 square centimeters [cm$^2$] per 1.0 liter [l] of displacement volume of the internal combustion engine. Preference is given to an embodiment in which the screening layer provides a screening area of at least 25 cm$^2$ per 1.0 l of displacement volume of the internal combustion engine. This means in other words for example that, in the case of an internal combustion engine which is a diesel engine and has a displacement volume of 2.0 l, use is made in the exhaust gas recirculation line of a screening layer which has a screening area of at least 20 cm², preferably of at least 50 cm². During operation in the exhaust gas recirculation line, the screening layer in this case regularly generates, under flow conditions which are usual in this case, a pressure loss of no more than 20 millibar [mbar], in particular of at most 10 mbar.

In accordance with a further feature of the invention, the screening layer is positioned obliquely with respect to the direction of flow of the exhaust gas through the exhaust gas recirculation line. The oblique flow against the screening layer, precisely in combination with a larger construction of the screening layer than the average cross section, supports a through flow behavior of the exhaust gas that results in a low pressure loss. A particular reason for this is also that an increased number of through openings is provided for the exhaust gas by the oblique configuration, which means that in spite of local clogging of the screening layer during the operation of the exhaust gas recirculation line, it is nevertheless possible to maintain a low pressure loss.

In accordance with an added feature of the invention, the exhaust gas recirculation line has a local widening in the region of the screening layer. What is particularly meant by this is that a larger cross section of the exhaust gas recirculation line is produced in the region of the screening layer. This consequently forms a type of diffuser which, through an enlargement of the flow cross section, results in a slowing of the flow velocity of the exhaust gas in the exhaust gas recirculation line. This measure too leads to the flow through the screening layer taking place with a minimum pressure loss. The local widening is preferably such that the cross section of the exhaust gas recirculation line is at least increased by 30%. The widening in this case advantageously also includes a connection region of segments of the exhaust gas recirculation line, such as flanges or the like, for example. This simultaneously opens the possibility of a permanent and secure fastening of the screening layer between the segments of the exhaust gas recirculation lines.

In accordance with an additional feature of the invention, the screening layer includes a woven fabric having wire filaments. It is, of course, possible in principle to use a nonwoven fabric having wire filaments in which there is a "chaotic" distribution of the wire filaments. However, preference is given to a type of woven fabric, that is to say a structure, in which the wire filaments are disposed or positioned in an order with respect to one another and interacting with one another. The spacings of the wire filaments from one another and the resulting openings for the passage of the exhaust gas flow can thus be constructed to be very uniform. The wire filaments are regularly made of a material which is resistant to high temperature and corrosion, such as steel including chromium and/or aluminum, for example. In the case of such a woven fabric, at least two different types of wire filaments are preferably provided, for example thicker and thinner filaments. The wire filaments regularly have a filament thickness within a range of from 30 to 300 micrometers [μm], in particular within a range of from 50 to 150 μm. Should different wire filaments be provided to build up the woven fabric, thicker wire filaments preferably have a filament thickness from about 100 to 300 μm and thinner wire filaments preferably have a filament thickness from about 30 to 150 μm.

In accordance with yet another feature of the invention, the screening layer has a majority of openings having a width of at least 0.05 mm. Very particular preference is given in this case for at least 90% of the openings to have such a width. The term "width" is intended to mean the largest width for the openings if they are not round. With regard to the width, a range of from 0.1 to 0.25 mm is preferred. There is thus sufficient security for the turbocharger, which means that corresponding foreign bodies are retained and at the same time the induced exhaust gas is influenced to only a minor extent with respect to the pressure conditions.

In accordance with yet a further feature of the invention, the wire filaments are integrally material-connected to one another. Even if the provision of the wire filaments in the form of a woven fabric already partially achieves a sufficient connection of the wire filaments with one another where the openings in these filaments permanently maintain their width, a technical joining connection or material connection between the wire filaments which employs an assembly technique can also be advantageous in this case. Possible techniques in principle are brazing, sintering and/or welding of the wire filaments. Preference is given in this case to a welded joint, in particular to a welded joint which has been produced by capacitor discharge pulse welding. In capacitor discharge pulse welding, the wire filaments have a current applied to them under pressure and are thus welded.

In accordance with yet an added feature of the invention, the configuration can be developed by forming the screening layer with a plurality of plies, with the plies being connected to one another. A ply in this case regularly includes a screen construction which is formed with wires and/or wire filaments. These metal components of the screening layer or of the plies are now preferably welded to one another, in particular being constructed to lie directly against one another. The plies in this case can have different functions, for example a screening function, a retaining function, a power supply function or the like. It should be noted in addition that the connection is made in particular directly or straightly, which accordingly means that there is not only a connection through the exhaust gas line. Rather, additional retaining elements and/or a direct contact of the plies with one another can represent the connection.

In accordance with yet an additional feature of the invention, one ply is configured with a wire construction which is configured with interspaces having a dimension of at least 5.0 mm. Consequently, the wire construction is configured with a significantly greater degree of openness. Accordingly, this wire construction primarily has a retaining function. In principle, it is not absolutely necessary for the wire construction and a screening layer configured as a woven fabric to have the same area, although this is preferred. With regard to the wire construction, it is also proposed that it is formed with wire filaments (in particular thick ones) which have approximately the same dimensions as those stated above.

In accordance with still another feature of the invention, very particular preference is given to this embodiment of the configuration when the screening layer is disposed downstream of a ceramic wall filter, as seen in the direction of flow. What is meant by a "wall filter" is in particular a wall flow filter which is formed in the manner of a honeycomb body formed with porous material, wherein the channels are alternately closed. This results in a forced flow of the exhaust gas through the porous walls of the honeycomb body. It has been found, specifically during the operation of an exhaust gas system having such a wall filter, in particular if it includes silicon carbide, that constituents which pose a threat to downstream-mounted components of the exhaust gas system are repeatedly detached. Therefore, it is now proposed in this case to provide such a screening layer in the direction of flow downstream of the ceramic wall filter. In so doing, the screening layer particularly protects the downstream turbocharger from the detached parts of the ceramic wall filter.

In accordance with still a further feature of the invention, particular preference is also given to an embodiment in which the screening layer is disposed between a cooler of the exhaust gas recirculation line and the turbocharger. The term "cooler" is in particular intended to refer to an exhaust gas cooler. The exhaust gas at the same time flows through the exhaust gas recirculation line with a somewhat lower flow velocity by first bringing the exhaust gas to a lower temperature through the use of the exhaust gas cooler. This in turn has advantages when flowing through the screening layer, since this layer has a lower pressure loss as compared with the still hot exhaust gas upstream of the exhaust gas cooler.

With the objects of the invention in view, there is concomitantly provided a motor vehicle, comprising at least one such configuration according to the invention. As has already been indicated a number of times, the above-described configuration is proposed, in particular, in combination with a motor vehicle.

Other features which are considered as characteristic for the invention are set forth in the appended claims, noting that the features listed individually in the dependent claims can be combined with one another in any desired, technologically appropriate, manner and demonstrate further embodiments of the invention.

Although the invention is illustrated and described herein as embodied in a configuration having a protected turbocharger in an exhaust gas recirculation line and a motor vehicle having the configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
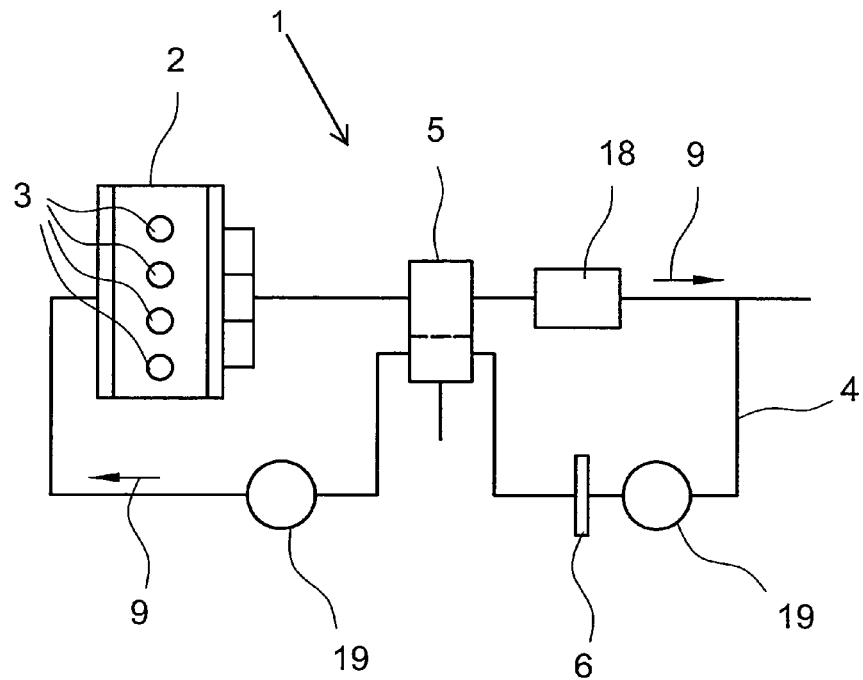
FIG. 1 is a block diagram of a first embodiment of a configuration according to the invention.

Referring now to the figures of the drawings in detail and first, particularly, to FIG. 1 thereof, there is seen a first embodiment variant of a configuration 1 for treating exhaust gases of an internal combustion engine 2. The internal combustion engine 2 in this case is embodied with four cylinders which each have a combustion chamber. The sum of the volumes of the combustion chambers gives a displacement volume 3 of the internal combustion engine 2. The exhaust gas generated in the internal combustion engine 2 leaves the internal combustion engine 2 in a direction of flow 9 and first flows through a turbine of a turbocharger 5 before subsequently reaching a ceramic wall filter 18. A branch for an exhaust gas recirculation line 4 is shown beyond the ceramic wall filter 18 in the direction of flow, with a portion of the exhaust gas being routed back to the internal combustion engine 2 again in the direction of flow 9. The exhaust gas in the exhaust gas recirculation line 4 is then first fed to a cooler 19, namely an "optional" exhaust gas cooler, whereupon the temperature of the exhaust gas is reduced. The exhaust gas subsequently flows through a screening layer 6 before it is fed, together with the combustion air, to a compressor of the turbocharger 5. The compressed exhaust gas flow is then fed, for example, to yet a further cooler 19 (in particular a so-called charge-air cooler) and finally passed into the internal combustion engine again.

Figure 2:
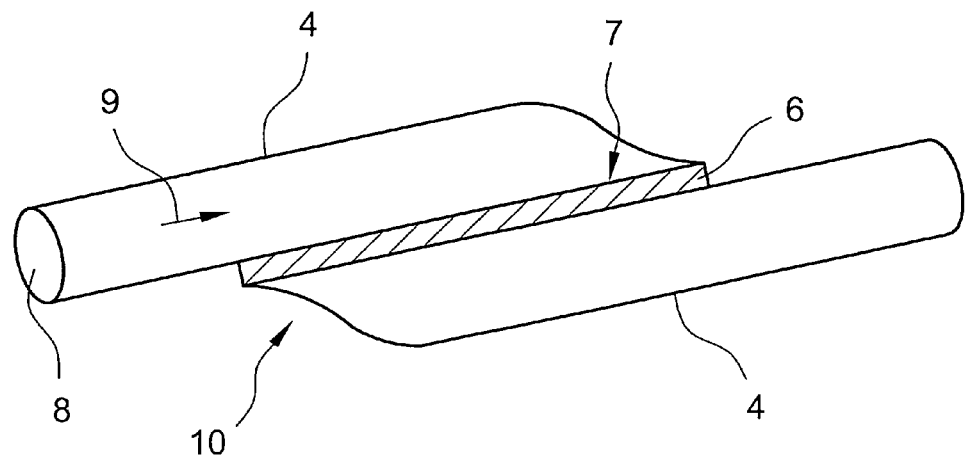
FIG. 2 is a perspective view of a preferred embodiment variant of a screening layer.

A concrete embodiment variant of the exhaust gas recirculation line 4 with a screening layer 6 is illustrated in FIG. 2. The exhaust gas recirculation line 4 in this case is normally substantially round in construction, so that an indicated average cross section 8 is obtained. There is now provided a construction of the gas recirculation line 4 with a widening 10 in which the screening layer 6 is positioned. In the illustrated embodiment variant, the two sections of the exhaust gas recirculation line have a kind of flange which is formed laterally in the direction of extension of the exhaust gas recirculation line. These flanges serve more to accommodate the screening layer 6, which is thus positioned obliquely with respect to the direction of flow 9 of the exhaust gas and has a screening area 7 which is considerably larger than the average cross section 8 of the exhaust gas recirculation line 4. Such a screening layer is distinguished by a particularly low pressure loss with regard to the throughflow of exhaust gas.

Figure 3:
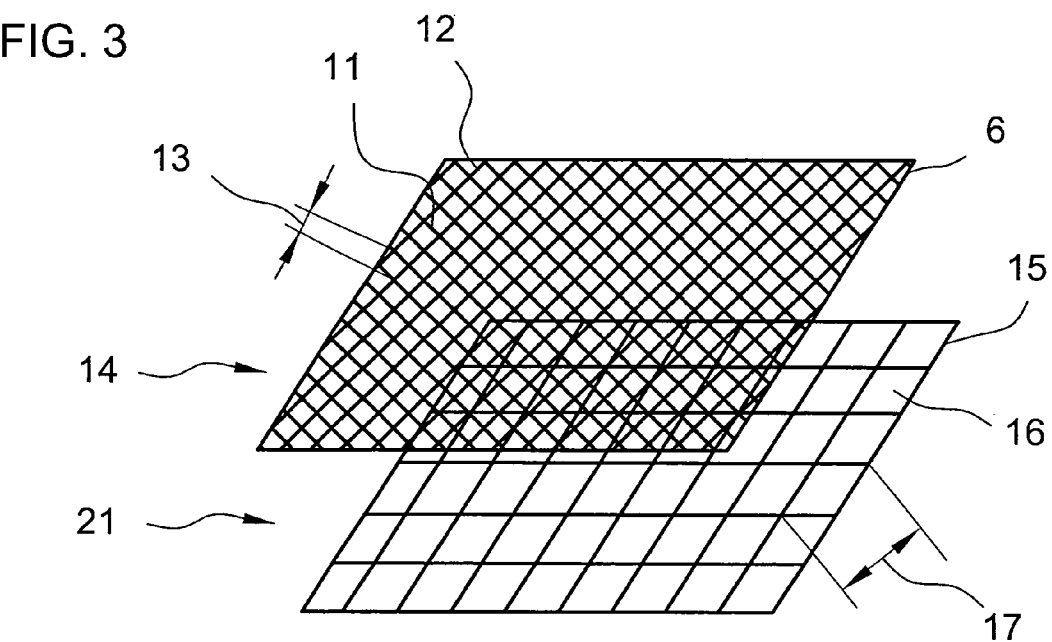
FIG. 3 is a perspective view of a further embodiment variant of the screening layer.

FIG. 3 illustrates a screening layer 6 with a plurality of plies, namely a first ply 14 and a second ply 21. The first ply 14 of the screening layer 6 is composed of a woven fabric having wire filaments 11. The wire filaments 11 are woven together in such a way that openings 12 are formed having a width 13 of at least 0.08 mm. By contrast, the second ply 21 includes a wire construction 15 which is configured with interspaces 16 having a dimension 17 of at least 5 mm. The woven fabric 14 and the wire construction 15 are welded to one another, with an exploded representation being chosen in this case. Finally, the two plies lie directly on top of one another and are advantageously connected to one another using a capacitor discharge pulse welding process. With regard to the orientation of such a screening layer in the exhaust gas flow, it is preferred that the exhaust gas first flows through the woven fabric 14 and then through the wire construction 15.

Figure 4:
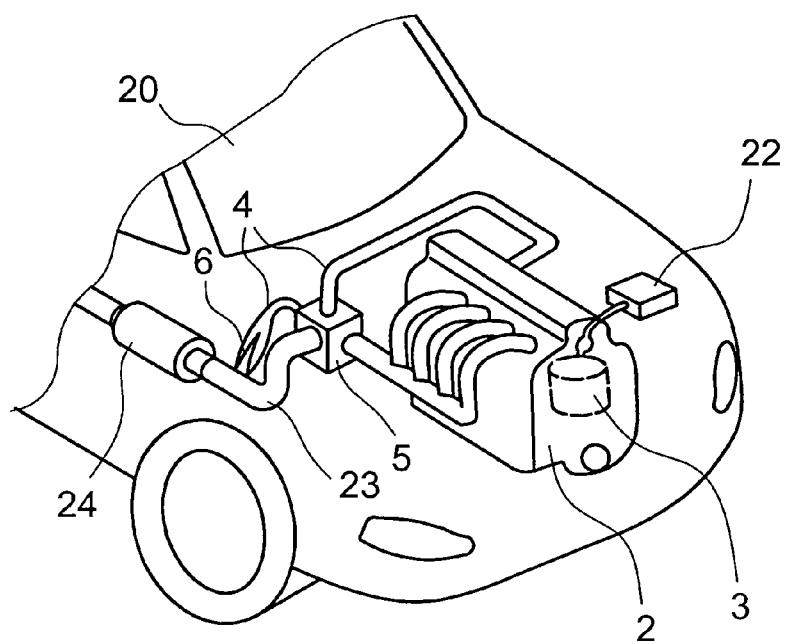
FIG. 4 is a perspective view of a further embodiment variant of the configuration according to the invention.

FIG. 4 illustrates a further embodiment variant of the configuration 1 in a motor vehicle 20. Centrally represented is once more the internal combustion engine 2 with the partially indicated displacement volume 3. The operation of the internal combustion engine 2, the exhaust gas recirculation and similar processes is regularly controlled by an engine control unit 22. Starting from the internal combustion engine 2, the exhaust gas first flows again toward the turbocharger 5 and then further along an exhaust gas line 23 toward catalytic converters 24, where provided. Leading away from the exhaust gas line 23 is the exhaust gas recirculation line 4 which provides a connection toward the turbocharger 5. Before the exhaust gas in the exhaust gas recirculation line 4 reaches the turbocharger 5, there is once more provided a screening layer 6 through which the exhaust gas flows. In this embodiment variant, the screening layer 6 is constructed as a bag or a simple fold which is itself made dimensionally stable, particularly through the provision of a corresponding wire construction. The exhaust gas flow compressed in the turbocharger 5 is now fed, together with the charge air, to the internal combustion engine 2 again.

The measures proposed herein particularly represent a protection for the turbocharger in the exhaust gas recirculation line, with it being possible at the same time to permanently maintain a minimum influence on the flow of the exhaust gas, and hence also the desired charge pressures.

The invention claimed is:

1. A configuration for treating exhaust gases of an internal combustion engine having a predetermined displacement volume, the configuration comprising:
    an exhaust gas recirculation line having an average cross section;
    a turbocharger, exhaust gas flowing through said exhaust gas recirculation line interacting with said turbocharger; and
    a screening layer disposed in said exhaust gas recirculation line upstream of said turbocharger, said screening layer being larger than said average cross section of said exhaust gas recirculation line;
    said screening layer including a woven fabric having at least two different types of wire filaments with different filament thicknesses;
    said screening layer having a majority of openings with a width in a range of from 0.1 to 0.25 millimeters.

2. The configuration according to claim 1, wherein said screening layer provides a screening area of at least 10 square centimeters per 1.0 liter of the displacement volume of the internal combustion engine.

3. The configuration according to claim 1, wherein said screening layer is positioned obliquely relative to a direction of flow of the exhaust gas through said exhaust gas recirculation line.

4. The configuration according to claim 1, wherein said exhaust gas recirculation line has a local widening in vicinity of said screening layer.

5. The configuration according to claim 1, wherein said wire filaments are integrally material-connected to one another.

6. The configuration according to claim 1, which further comprises a ceramic wall filter, said screening layer being disposed downstream of said ceramic wall filter in a direction of flow of exhaust gas.

7. The configuration according to claim 1, which further comprises a cooler disposed in said exhaust gas recirculation line, said screening layer being disposed between said cooler and said turbocharger.

8. A motor vehicle, comprising at least one configuration according to claim 1.

9. The configuration according to claim 1, wherein said exhaust gas recirculation line has a cross section, and said screening layer is formed as a surface spanning said cross section of said exhaust gas recirculation line.

10. The configuration according to claim 1, wherein said screening layer provides a screening area, and said screening layer is a shaped structure having only a single inflow channel through which the exhaust gas is brought into contact with at least a majority of said screening area.

11. The configuration according to claim 1, wherein said screening layer has a maximum pressure loss of not more than 20 mbar.

12. The configuration according to claim 1, wherein said screening layer has a maximum pressure loss of not more than 10 mbar.

13. The configuration according to claim 1, wherein said screening layer is formed with a plurality of plies being connected to one another.

14. The configuration according to claim 13, wherein one of said plies has a wire construction with interspaces having a dimension of at least 5.0 millimeters.

15. The configuration according to claim 1, wherein said screening layer is configured to retain only foreign bodies.

16. The configuration according to claim 15, wherein said foreign bodies are parts of upstream-mounted exhaust gas treatment components, their coatings and/or additive solids.

* * * * *